(12) United States Patent
Lin et al.

(10) Patent No.: US 10,698,309 B2
(45) Date of Patent: Jun. 30, 2020

(54) LIGHT SOURCE MODULE OF PHOTO PRINTER

(71) Applicant: Primax Electronics Ltd., Taipei (TW)

(72) Inventors: Yun-Yi Lin, Taipei (TW); Mu-Jung Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/423,920

(22) Filed: May 28, 2019

(65) Prior Publication Data

US 2020/0057361 A1 Feb. 20, 2020

Related U.S. Application Data

(60) Provisional application No. 62/719,796, filed on Aug. 20, 2018.

(51) Int. Cl.
*G03B 27/54* (2006.01)
*G03B 27/52* (2006.01)

(52) U.S. Cl.
CPC .......... *G03B 27/54* (2013.01); *G03B 27/522* (2013.01)

(58) Field of Classification Search
CPC ...... G03B 27/54; G03B 27/522; G03G 15/04; G02B 27/123; G02B 3/0006
See application file for complete search history.

(56) References Cited

U.S. PATENT DOCUMENTS

| | | | |
|---|---|---|---|
| 10,055,624 B2* | 8/2018 | Brock | G06K 7/1413 |
| 2005/0067944 A1* | 3/2005 | Masuda | B41J 2/451 |
| | | | 313/501 |
| 2011/0280628 A1* | 11/2011 | Kim | G02B 5/003 |
| | | | 399/218 |

* cited by examiner

*Primary Examiner* — Karabi Guharay
(74) *Attorney, Agent, or Firm* — Kirton McConkie; Evan R. Witt

(57) ABSTRACT

A light source module of a photo printer includes a first micro light source, a second micro light source, a rod lens array and a microlens. The first micro light source emits a first light beam. The second micro light source emits a second light beam. The rod lens array is arranged between the first micro light source, the second micro light source and a film paper. The microlens is arranged between the first micro light source, the second micro light source and the rod lens array. The microlens is used for converging the projection angles of the first light beams and the second light beam. The microlens has an optical axis. The second micro light source is arranged along the optical axis. The first micro light source is arranged beside a first side of the optical axis.

10 Claims, 5 Drawing Sheets

US 10,698,309 B2

LIGHT SOURCE MODULE OF PHOTO PRINTER

CROSS-REFERENCE TO RELATED APPLICATION

This application claims priority to U.S. Provisional Patent Application No. 62/719,796 filed Aug. 20, 2018, the contents of which are incorporated herein by reference.

FIELD OF THE INVENTION

The present invention relates to a light source module, and more particularly to a light source module of a photo printer.

BACKGROUND OF THE INVENTION

Generally, the commercially available photo printer can transfer images to film papers in order to print out colorful photos. In recent years, small-sized photo printers have been introduced into the market. The small-sized photo printer has the advantage of small volume. Moreover, the small-sized photo printer can receive images from smart phones or other electronic devices in a wireless transmission manner and thus print out the photos. Consequently, the photo printers are favored by users.

For example, the structure of a conventional photo printer is disclosed in U.S. Pat. No. 7,371,025. The conventional photo printer comprises a film paper tray, an image reading and writing region, plural transfer rollers and plural distribution rollers. The image reading and writing region comprises a light source module. The operations of the conventional photo printer will be simply described as follows. After the conventional photo printer is enabled, the film paper placed on the film paper tray is transferred to the image reading and writing region. The light source module of the image reading and writing region emits light beams. The light beams are projected onto the film paper. Consequently, the exposure of the film paper is performed. Then, the film paper is transferred to the region between the plural distribution rollers. Since the film paper is pressed by the plural distribution rollers, the developer liquid in the film paper flows out and the film paper is developed. Afterwards, the developed film paper is outputted.

FIG. 1 schematically illustrates the relationship between a light source module and a film paper of a conventional photo printer. The light source module 1 of the conventional photo printer comprises plural first light sources 11, plural second light sources 12, plural third light sources 13 and a rod lens array 14. The first light sources 11 emit red light beams. The second light sources 12 emit green light beams. The third light sources 13 emit blue light beams. The rod lens array 14 is arranged between the plural first light sources 11, the plural second light sources 12, the plural third light sources 13 and a film paper 10. After the light beams with various colors are transmitted through the rod lens array 14, the light beams are projected onto the film paper 10.

The inner structure and the exposure operation of the film paper will be descried as follows. Please refer to FIG. 1 and FIG. 2. FIG. 2 schematically illustrates a portion of the conventional film paper during the exposure operation. The film paper 10 comprises a surface layer 101, a red photosensitive gel layer 102, a green photosensitive gel layer 103, a blue photosensitive gel layer 104, an image receiving layer 105 and a gap 106.

During the exposure operation of the film paper 10, the light source module 1 is enabled to emit the light beams. That is, the first light sources 11 emit the red light beams B1, the second light sources 12 emit the green light beams B2, and the third light sources 13 emit the blue light beams B3. After the red light beams B1 are transmitted through the rod lens array 14, the red light beams B1 are projected to the film paper 10. After the red light beams B1 are transmitted through the surface layer 101, the red light beams B1 are projected to the red photosensitive gel layer 102. Consequently, the cyan dye molecules that are disposed in the red photosensitive gel layer 102 and projected by the red light beams B1 are fixed in the red photosensitive gel layer 102.

Similarly, after the green light beams B2 are transmitted through the rod lens array 14 and the surface layer 101, the green light beams B2 are projected to the green photosensitive gel layer 103. Consequently, the magenta dye molecules that are disposed in the green photosensitive gel layer 103 and projected by the green light beams B2 are fixed in the green photosensitive gel layer 103.

Similarly, after the blue light beams B3 are transmitted through the rod lens array 14 and the surface layer 101, the blue light beams B3 are projected to the blue photosensitive gel layer 104. Consequently, the yellow dye molecules that are disposed in the blue photosensitive gel layer 104 and projected by the blue light beams B3 are fixed in the blue photosensitive gel layer 104.

Moreover, white light beams are projected to the red photosensitive gel layer 102, the green photosensitive gel layer 103 and the blue photosensitive gel layer 104. Consequently, the dye molecules that are disposed in the photosensitive gel layers 102, 103 and 104 and projected by the white light beams are fixed in the photosensitive gel layers 102, 103 and 104.

The developing operation of the film paper will be descried as follows. Please refer to FIG. 1 and FIG. 3. FIG. 3 schematically illustrates a portion of the conventional film paper during the developing operation. During the developing operation of the film paper 10, the film paper 10 is pressed and squeezed. Consequently, a developer pool (not shown) of the film paper 10 is broken and a developer liquid 107 in the developer pool flows to the red photosensitive gel layer 102, the green photosensitive gel layer 103, the blue photosensitive gel layer 104 and the image receiving layer 105 through the gap 106. During the developing operation, the fixed dye molecules in the photosensitive gel layers 102, 103 and 104 are not influenced by the developer liquid 107. Except for the fixed dye molecules, the other dye molecules in the photosensitive gel layers 102, 103 and 104 are delivered to the image receiving layer 105 by the developer liquid 107. Consequently, the film paper 10 is developed, and the image is shown on the film paper 10.

Generally, the first light sources 11, the second light sources 12 and the third light sources 13 in the light source module 1 of the conventional photo printer are provided by a liquid crystal display (LCD) or an organic light emitting diode (OLED). Since the luminous efficiency of LCD and OLED is not high, the time period of performing the exposure operation of the film paper 10 is long. For showing the white part of the image, the light source module 1 of the conventional photo printer has to project white light beams to the corresponding area of the film paper 10. Since the white light beam is a mixture of the red, green and blue light beams, the method of exposing the white part of the image by the light source module 1 is complicated. Firstly, the first light sources 11, the second light sources 12 and the third light sources 13 emit the red light beams, the green light beams and the blue light beams. Then, the red light beams, the green light beams and the blue light beams are projected to the corresponding area of the film paper 10. Consequently, the exposure operation on the corresponding colors is performed. That is, for exposing the white part of the image, the corresponding area of the film paper 10 needs to be exposed by the red, green and blue light beams. Since the exposure time is long, it is difficult to increase the printing speed of the conventional photo printer.

Therefore, there is a need of providing an improved light source module of a photo printer in order to shorten the exposure time.

SUMMARY OF THE INVENTION

An object of the present invention provides a light source module of a photo printer in order to shorten the exposure time of the film paper and increase the printing speed.

In accordance with an aspect of the present invention, a light source module of a photo printer is provided for projecting at least one light beam to a film paper. The light source module includes at least one first micro light source, at least one second micro light source, a rod lens array and at least one microlens. The at least one first micro light source emits at least one first light beam. The at least one second micro light source emits at least one second light beam. The rod lens array is arranged between the at least one first micro light source, the at least one second micro light source and the film paper. After the at least one first light beam and the at least one second light beam are transmitted through the rod lens array, the at least one first light beam and the at least one second light beam are projected to the film paper. The at least one microlens is arranged between the at least one first micro light source, the at least one second micro light source and the rod lens array, and converges the projection angles of the at least one first light beams and the at least one second light beam. Each of the at least one microlens has an optical axis. The corresponding second micro light source is arranged along the optical axis. The corresponding first micro light source is arranged beside a first side of the optical axis.

In accordance with another aspect of the present invention, a light source module of a photo printer is provided for projecting at least one light beam to a film paper. The light source module includes at least one first micro light source, at least one second micro light source, a rod lens array and at least one microlens. The at least one first micro light source emits at least one first light beam. The at least one second micro light source emits at least one second light beam. The rod lens array is arranged between the at least one first micro light source, the at least one second micro light source and the film paper. After the at least one first light beam and the at least one second light beam are transmitted through the rod lens array, the at least one first light beam and the at least one second light beam are projected to the film paper. The at least one microlens is arranged between the at least one first micro light source, the at least one second micro light source and the rod lens array, and converges the projection angles of the at least one first light beams and the at least one second light beam. Each of the at least one microlens has an optical axis. The corresponding first micro light source is arranged beside a first side of the optical axis. The corresponding second micro light source is arranged beside a second side of the optical axis.

From the above descriptions, the present invention provides a light source module of a photo printer. The light source module uses micro light sources. The luminous efficiency of the micro light sources is higher than the luminous efficiency of LCD and OLED in the conventional technologies. Since the light source module of the present invention provides the light beams with high luminance, the exposure time of the film paper is shortened. Moreover, the first micro light source and the third micro light source are not arranged along the optical axis. Consequently, the first light beam, the second light beam and the third light beam can be projected onto the same position. Since a single exposure operation is sufficient to complete the exposure of the color light beams, the exposure time of the film paper is largely reduced. In other words, the light source module of the present invention is effective to increase the printing speed of the photo printer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides a light source module of a photo printer.

Figure 1:
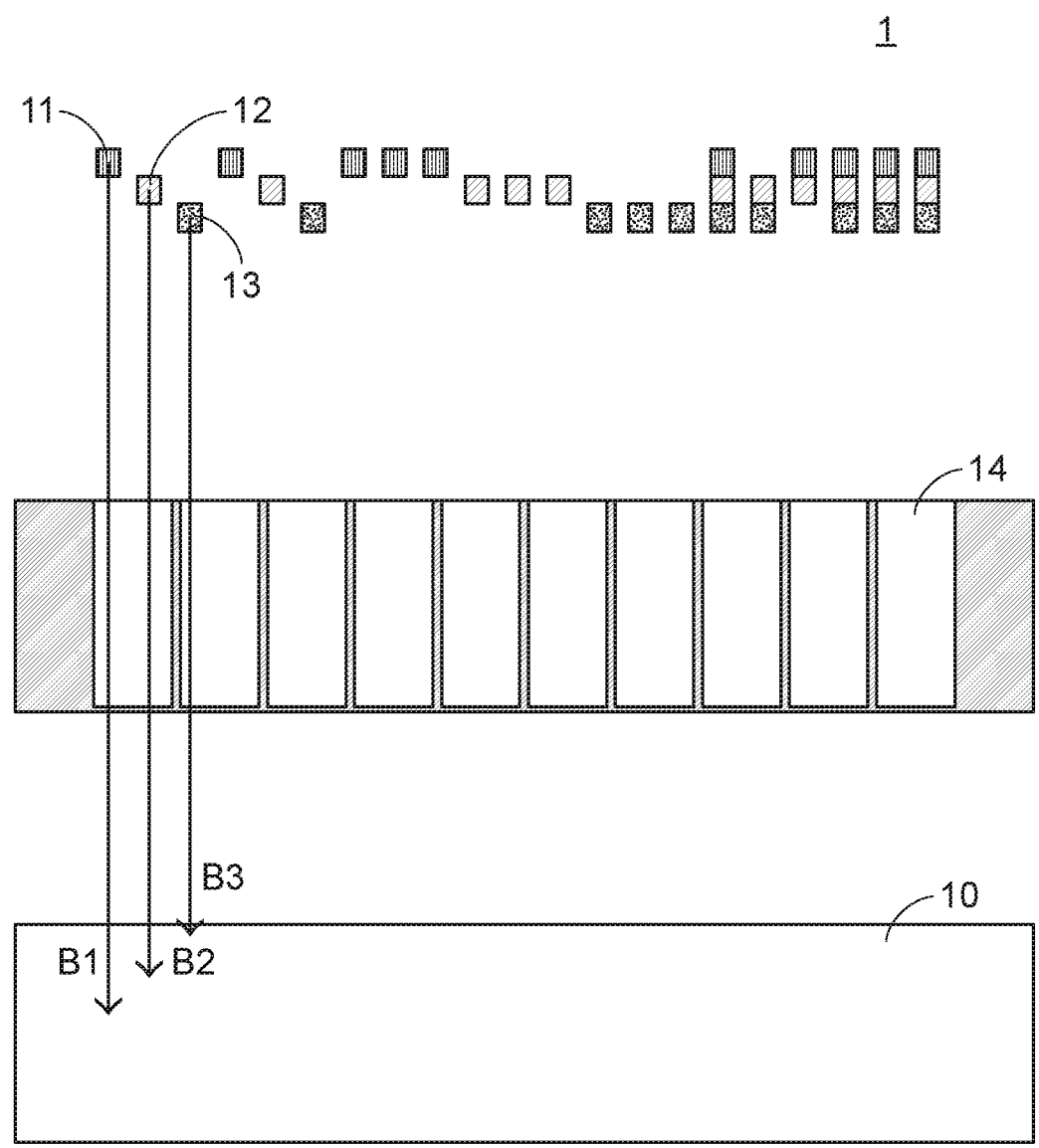
FIG. 1 schematically illustrates the relationship between a light source module and a film paper of a conventional photo printer.
Figure 2:
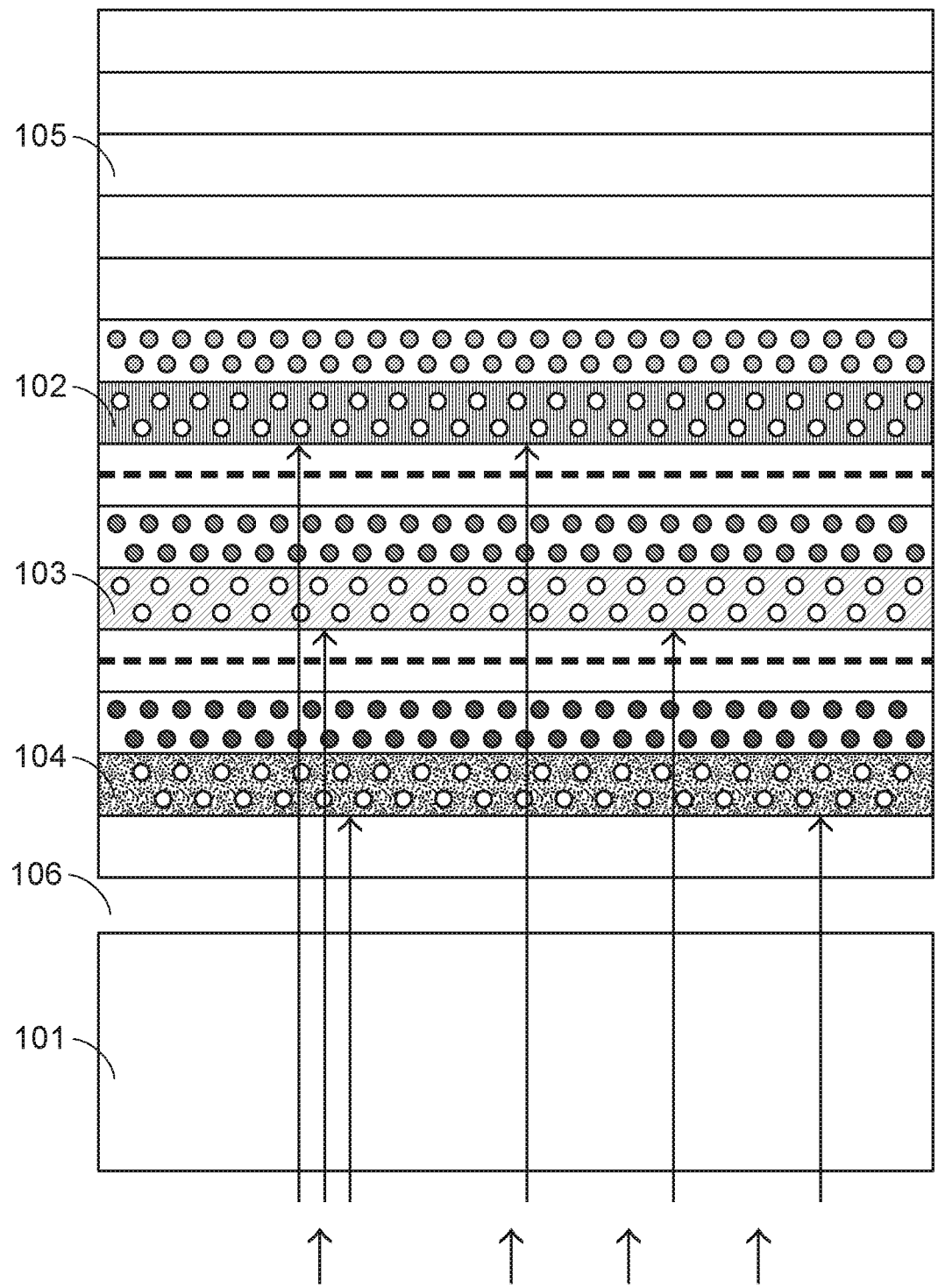
FIG. 2 schematically illustrates a portion of the conventional film paper during the exposure operation.
Figure 3:
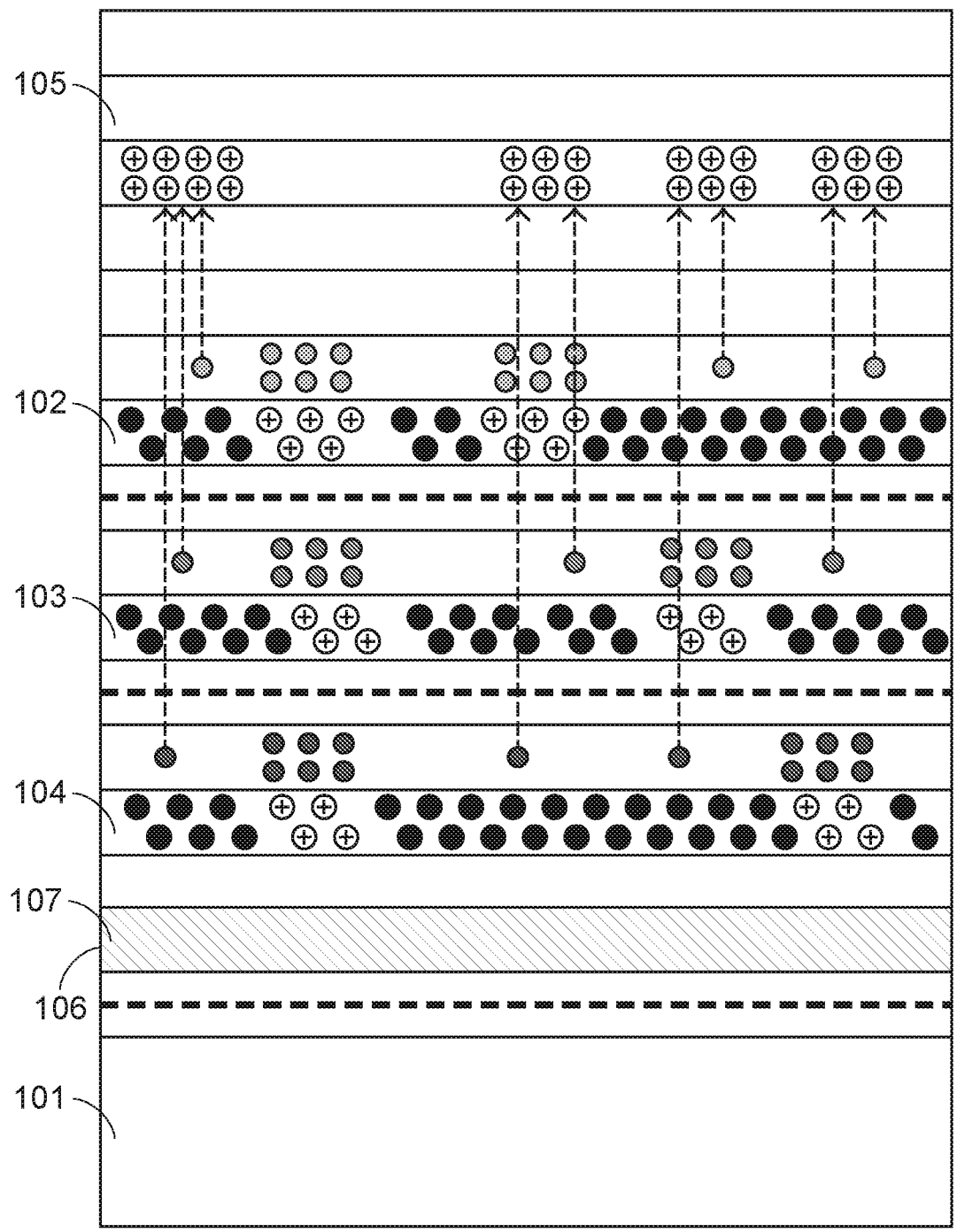
FIG. 3 schematically illustrates a portion of the conventional film paper during the developing operation.
Figure 4:
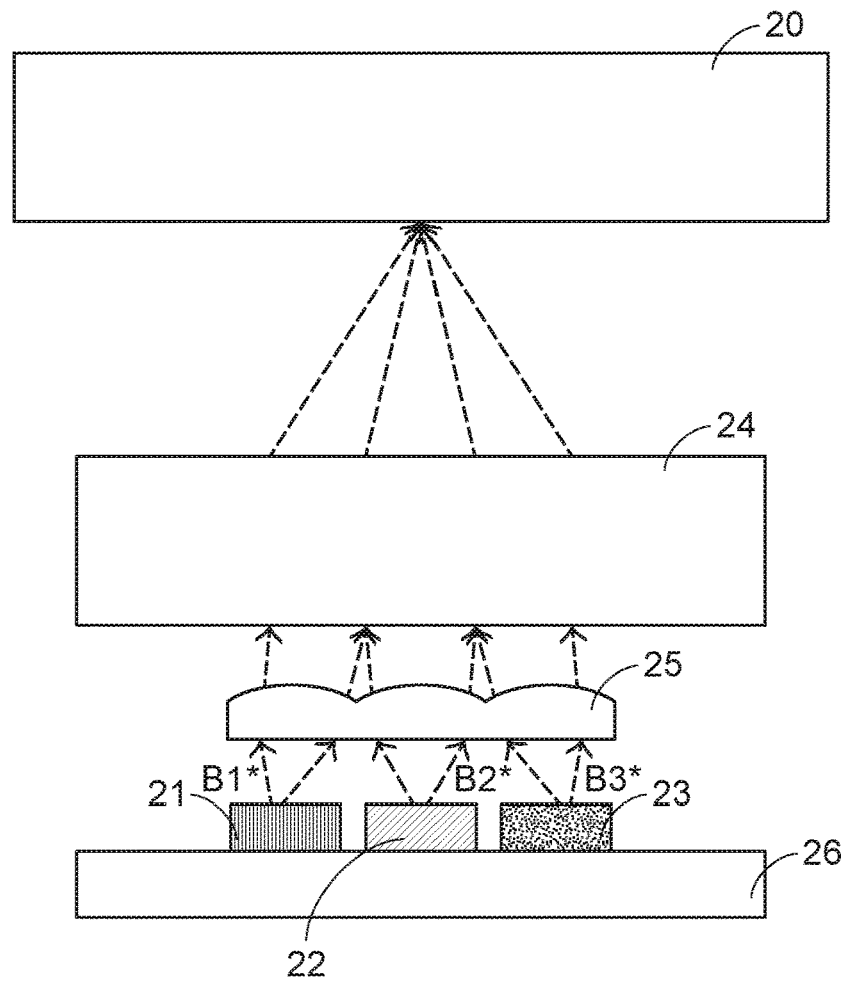
FIG. 4 schematically illustrates the relationship between a light source module and a film paper of a photo printer according to an embodiment of the present invention.

FIG. 4 schematically illustrates the relationship between a light source module and a film paper of a photo printer according to an embodiment of the present invention. The light source module 2 of the photo printer comprises plural first micro light sources 21, plural second micro light sources 22, plural third micro light sources 23, a rod lens array 24, plural microlenses 25 and a circuit board 26. For succinctness, only one first micro light source 21, one second micro light source 22, one third micro light source 23 and one microlens 25 are shown in the drawing. The plural first micro light sources 21, the plural second micro light sources 22 and the plural third micro light sources 23 are installed on the circuit board 26 and electrically connected with the circuit board 26. The first micro light sources 21 emit first light beams B1*. The second micro light sources 22 emit second light beams B2*. The third micro light sources 23 emit third light beams B3*. Each first micro light source 21, the corresponding second micro light source 22 and the corresponding third micro light source 23 belong to one micro light source group. Each microlens 25 is aligned with one first micro light source 21, one second micro light source 22 and one third micro light source 23. In an embodiment, the first micro light sources 21, the second micro light source 22 and the third micro light source 23 are micro light emitting diodes (Micro LED). The first light beams B1* are red light beams, the second light beams B2* are green light beams. The third light beams B3* are blue light beams. The circuit board 26 is a thin film transistor (TFT) glass substrate or a silicon substrate.

As shown in FIG. 4, the rod lens array 24 is arranged between the plural first micro light sources 21, the plural second micro light sources 22, the plural third micro light sources 23 and a film paper 20. After the light beams with various colors are transmitted through the rod lens array 24, the light beams are projected onto the film paper 20. The microlenses 25 are arranged between the corresponding first micro light sources 21, the corresponding second micro light sources 22, the corresponding third micro light sources 23 and the rod lens array 24. The microlenses 25 are used for converging the projection angles of the first light beams B1*, the second light beams B2* and the third light beams B3*. Consequently, the first light beams B1*, the second light beams B2* and the third light beams B3* are projected to the rod lens array 24 at enhanced light utilization efficiency.

Figure 5:
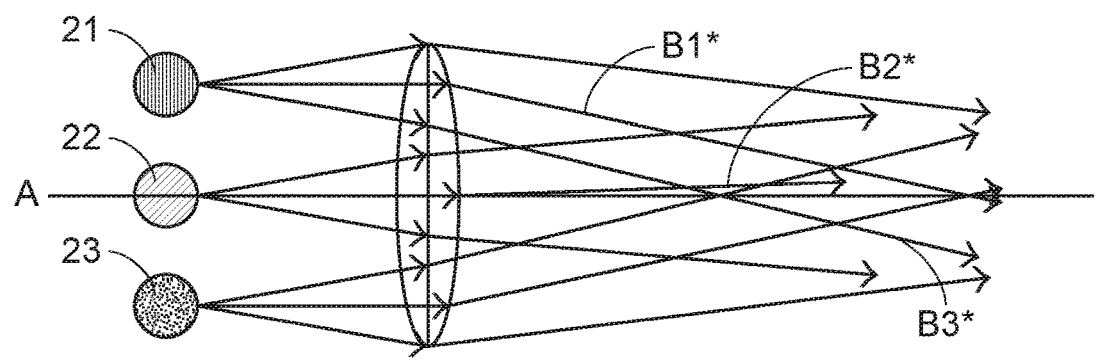
FIG. 5 schematically illustrates the relationship between the micro light sources and the microlens of the light source module of the photo printer according to the embodiment of the present invention.

The relationships between the microlens 25, the corresponding first micro light source 21, the corresponding second micro light source 22 and the corresponding third micro light source 23 will be described as follows. FIG. 5 schematically illustrates the relationship between the micro light sources and the microlens of the light source module in the photo printer according to the embodiment of the present invention. The microlens 25 has an optical axis A. The first micro light source 21 is arranged beside a first side of the microlens 25. That is, the first micro light source 21 is arranged beside a first side of the optical axis A. The second micro light source 22 is arranged along the optical axis A of the microlens 25. The third micro light source 23 is arranged beside a second side of the microlens 25. That is, the third micro light source 23 is arranged beside a second side of the optical axis A. In accordance with the present invention, the first micro light source 21 and the third micro light source 23 are not arranged along the optical axis A. In case that the projection angel of the first light beam B1* from the first micro light source 21 and the projection angel of the third light beam B3* from the third micro light source 23 are properly adjusted, the first light beam B1*, the second light beam B2* and the third light beam B3* can be projected onto the same position (see FIG. 5).

For showing the white part of the image, the first micro light sources 21, the second micro light sources 22 and the third micro light sources 23 of the light source module 2 are simultaneously enabled. Consequently, the first light beams B1*, the second light beams B2* and the third light beams B3* are projected to the corresponding area of the film paper where the white exposure operation is required. That is, while the film paper is exposed by the white light beams from the light source module 2, a single exposure operation is sufficient to fix the red, green and blue dye molecules on the photosensitive gel layers of the film paper. Consequently, the exposure time of the film paper 20 is largely reduced.

Figure 6:
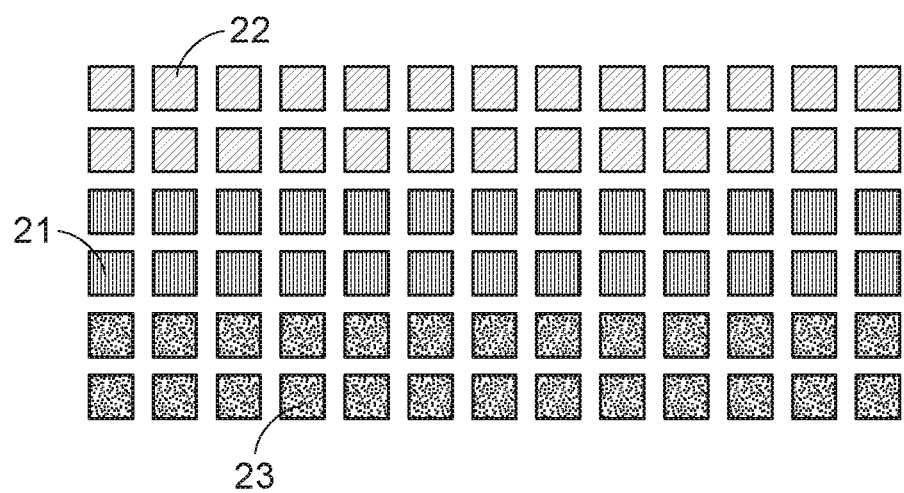
FIG. 6 is a schematic top view illustrating a first exemplary arrangement of the micro light sources of the light source module in the photo printer according to the embodiment of the present invention.
Figure 7:
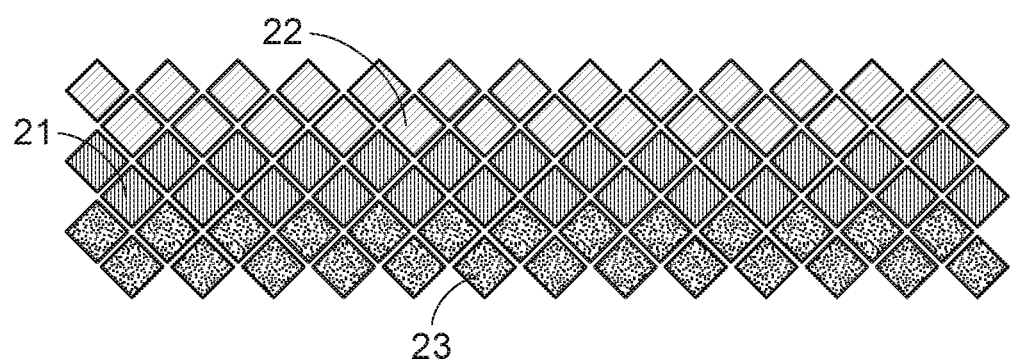
FIG. 7 is a schematic top view illustrating a second exemplary arrangement of the micro light sources of the light source module in the photo printer according to the embodiment of the present invention.

The arrangements of the plural first micro light sources 21, the plural second micro light sources 22 and the plural third micro light sources 23 will be described as follows. Please refer to FIG. 6 and FIG. 7. FIG. 6 is a schematic top view illustrating a first exemplary arrangement of the micro light sources of the light source module in the photo printer according to the embodiment of the present invention. FIG. 7 is a schematic top view illustrating a second exemplary arrangement of the micro light sources of the light source module in the photo printer according to the embodiment of the present invention. As shown in FIG. 6, the plural first micro light sources 21, the plural second micro light sources 22 and the plural third micro light sources 23 are arranged in a rectangular array. As shown in FIG. 7, the plural first micro light sources 21, the plural second micro light sources 22 and the plural third micro light sources 23 are arranged in a rhombus array. The arrangement of the rhombus array can effectively eliminate the black lines between the pixels because the black lines are generated by the gaps between the micro light sources.

The following three aspects should be specially described. Firstly, the plural first micro light sources 21, the plural second micro light sources 22 and the plural third micro light sources 23 of the light source module 2 in the photo printer of the present invention are installed on the circuit board 26 through any appropriate coupling means. That is, it is not necessary to encapsulate the micro light sources 21~23 and the circuit board 26 as the same package structure. Secondly, the numbers of the first micro light sources 21, the second micro light sources 22 and the third micro light sources 23 of the light source module 2 in the photo printer of the present invention are not restricted. For example, in some embodiments, the light source module comprises a single first micro light source, a single second micro light source and a dingy third micro light source. Thirdly, the white exposure operation of the light source module is presented herein for illustration only. That is, the method of performing the white exposure operation is not restricted. In fact, the light beams with any two primary colors of three primary colors may be mixed together according to the above exposure operation. Consequently, the use of the light source module in the photo printer of the present invention can shorten the exposure time.

From the above descriptions, the present invention provides a light source module of a photo printer. The light source module uses micro light sources. The luminous efficiency of the micro light sources is higher than the luminous efficiency of LCD and OLED in the conventional technologies. Since the light source module of the present invention provides the light beams with high luminance, the exposure time of the film paper is shortened. Moreover, the first micro light source and the third micro light source are not arranged along the optical axis. Consequently, the first light beam, the second light beam and the third light beam can be projected onto the same position. Since a single exposure operation is sufficient to complete the exposure of the color light beams, the exposure time of the film paper is largely reduced. In other words, the light source module of the present invention is effective to increase the printing speed of the photo printer.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A light source module of a photo printer for projecting at least one light beam to a film paper, the light source module comprising:
   at least one first micro light source emitting at least one first light beam;
   at least one second micro light source emitting at least one second light beam;
   a rod lens array arranged between the at least one first micro light source, the at least one second micro light source and the film paper, wherein after the at least one first light beam and the at least one second light beam are transmitted through the rod lens array, the at least one first light beam and the at least one second light beam are projected to the film paper; and
   at least one microlens arranged between the at least one first micro light source, the at least one second micro light source and the rod lens array, and converging projection angles of the at least one first light beams and the at least one second light beam, wherein each of the at least one microlens has an optical axis, the corresponding second micro light source is arranged along the optical axis, and the corresponding first micro light source is arranged beside a first side of the optical axis.

2. The light source module according to claim 1, wherein the light source module further comprises at least one third micro light source that emits at least one third light beam, wherein the corresponding third micro light source is arranged beside a second side of the optical axis.

3. The light source module according to claim 2, wherein the light source module further comprises a circuit board, wherein the at least one first micro light source, the at least one second micro light source and the at least one third micro light source are installed on and electrically connected with the circuit board.

4. The light source module according to claim 3, wherein the circuit board is a thin film transistor glass substrate or a silicon substrate.

5. The light source module according to claim 1, wherein the at least one first micro light source and the at least one second micro light source are arranged in a rectangular array or a rhombus array.

6. A light source module of a photo printer for projecting at least one light beam to a film paper, the light source module comprising:
   at least one first micro light source emitting at least one first light beam;
   at least one second micro light source emitting at least one second light beam;
   a rod lens array arranged between the at least one first micro light source, the at least one second micro light source and the film paper, wherein after the at least one first light beam and the at least one second light beam are transmitted through the rod lens array, the at least one first light beam and the at least one second light beam are projected to the film paper; and
   at least one microlens arranged between the at least one first micro light source, the at least one second micro light source and the rod lens array, and converging projection angles of the at least one first light beams and the at least one second light beam, wherein each of the at least one microlenses has an optical axis, the corresponding first micro light source is arranged beside a first side of the optical axis, and the corresponding second micro light source is arranged beside a second side of the optical axis.

7. The light source module according to claim 6, wherein the light source module further comprises at least one third micro light source that emits at least one third light beam, wherein the corresponding third micro light source is arranged along the optical axis.

8. The light source module according to claim 7, wherein the light source module further comprises a circuit board, wherein the at least one first micro light source, the at least one second micro light source and the at least one third micro light source are installed on and electrically connected with the circuit board.

9. The light source module according to claim 7, wherein the at least one first micro light source and the at least one second micro light source are arranged in a rectangular array or a rhombus array.

10. The light source module according to claim 6, wherein the at least one first micro light source and the at least one second micro light source are micro light emitting diodes.

* * * * *